(No Model.)
R. S. CLARK
WHIFFLETREE CLIP.
No. 288,922. Patented Nov. 20, 1883.
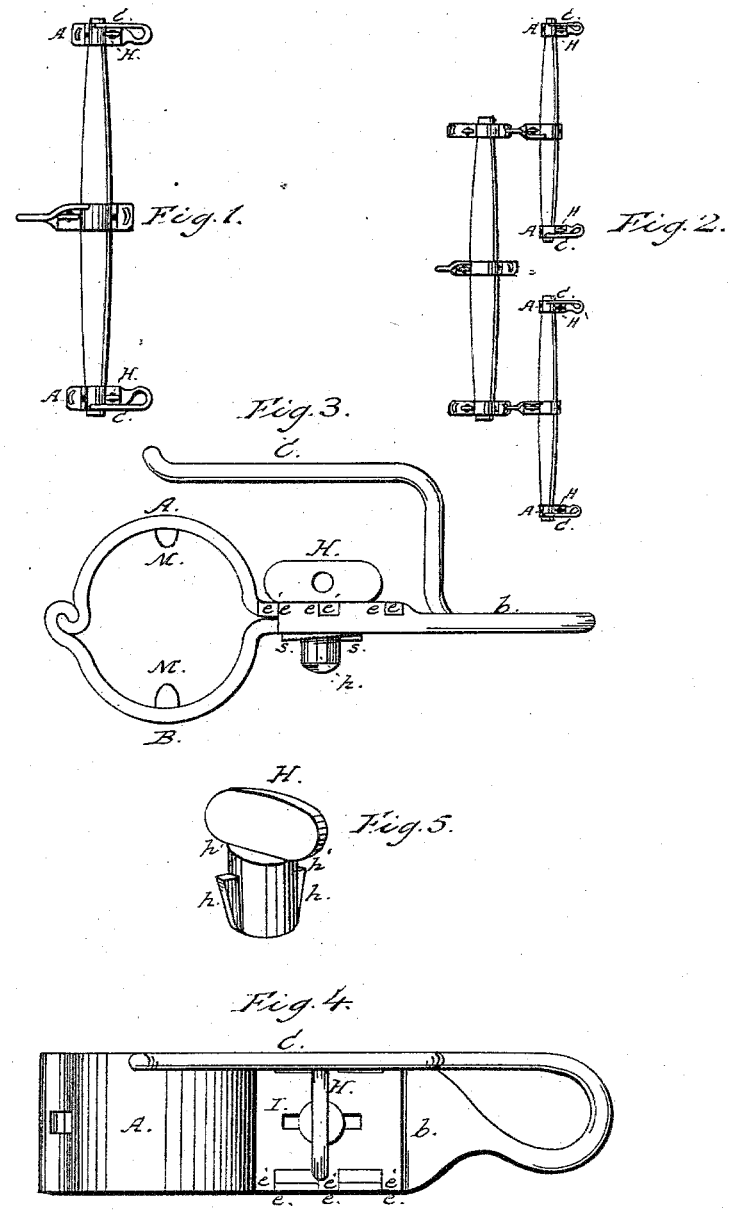
Attest:
H. W. Howard
C. H. Raider
Inventor,
Robert S. Clark
By C. S. Whitman
Atty.

UNITED STATES PATENT OFFICE.

ROBERT S. CLARK, OF HELENA, MONTANA TERRITORY.

WHIFFLETREE-CLIP.

SPECIFICATION forming part of Letters Patent No. 288,922, dated November 20, 1883.

Application filed October 27, 1883. (No model.)

*To all whom it may concern:*

Be it known that I, ROBERT S. CLARK, a citizen of the United States, residing at Helena, in the county of Lewis and Clarke, Territory of Montana, have invented certain new and useful Improvements in Whiffletree-Clips; and I do hereby declare the following to be a full, clear, and exact description of the invention, such as will enable others skilled in the art to which it appertains to make and use the same.

My invention relates to iron straps known as "clips," which are used on double or single trees for connecting the single-tree to the double-tree or to the trace; and the object of my invention is to render such clips readily detachable and adjustable, so that they may be removed or replaced with facility, and also readily adjusted on the tree.

In the accompanying drawings, Figures 1 and 2 illustrate the manner in which the clip is applied to single or double trees. Fig. 3 is a side view, and Fig. 4 a plan view, of the device. Fig. 5 illustrates the bolt which is made use of in locking the parts together.

The clip may be applied to double-trees, the ends or middle of single-trees, and to other objects to which it may be found applicable—as, for instance, neck-yokes, poles or shafts of vehicles, or plow-beams—and may be removed with facility in case the part to which it is attached should become broken.

The device consists of a connecting-bolt, B, and two pieces of plate or sheet metal, A and B, each of which is bent to such a form or curvature that when they are hinged or pivoted together they may be made to encircle the ends of the single-tree or part to which they are to be attached. The end of the upper part, A, projects outward from the whiffletree in such a manner as to form an extension, $a$, and the end of the lower part, B, projects outward in such a manner as to form an extension, $b$, and hook C. The pieces A and B are connected together by having their edges so turned as to lock into each other; or they may be hinged together in any appropriate manner. The lower extended part, $b$, of the clip is provided with raised edges having nicks or notches $e$ cut therein for the reception of projections $e'$, of corresponding size, formed upon the edges of the upper projecting part, $a$. By means of this construction the parts may be locked together, and when so locked may be secured in position by means of the bolt or pin H, which passes through them. Each of the parts is provided with holes I, in the side of which are cut nicks or notches, and the under sides of the hole passing through the lower part are raised in such a manner as to form inclined curves or spiral surfaces $s$. The connecting or locking bolt H has projecting lugs $h$, which travel upon the said spiral surfaces, and shoulders $h'$ so made that when the bolt is turned or forced home parts of the said shoulders $h'$ are pressed into the nicks or notches on the side of the hole I, and thus the bolt is secured in position. In some instances it may be desirable to prevent the clip from slipping on the single-tree or part to which it is attached, and to effect this purpose I provide projections M on the interior surface of the clip, which may be made to enter holes prepared for their reception in the single-tree.

The operation of the device will be obvious from the foregoing description of its construction. The pieces A and B having been made to encircle the parts of the single-tree to which the clip is to be attached, the projections $e'$ of the upper piece fit within the receptacles $e$ of the lower pieces. The locking-bolt D is then passed downward through the holes I, the nicks or notches cut in the sides of said holes allowing the lugs upon the bolt to pass freely, and turned upon its axes. This rotary motion of the bolt causes the lugs $h$ to travel upon the inclined curves or spiral surfaces $s$, draws the shoulders $h'$ downward against the surface of the upper part of the clip, and finally causes parts of the shoulders $h'$ to sink into notches on the edges of the hole I, which hold it firmly in position.

Having thus described my invention, I claim and desire to secure by Letters Patent of the United States—

1. The combination of the locking pin or bolt D, having lugs $h$ and shoulders $h'$, in combination with the plate A, having a hole, I, on the edge of which notches are cut, and the plate b, having a hole, I, on the lower edge of which spiral surfaces are formed, as and for the purposes described.

2. The combination of the parts A and B, hinged together as described, and each provided with projections M, as and for the purposes set forth.

In testimony whereof I affix my signature in presence of two witnesses.

ROBERT S. CLARK.

Witnesses:
C. S. WHITMAN,
EDWD. H. DOWNS.